United States Patent [19]

Grünbauer et al.

[11] Patent Number: 5,998,523
[45] Date of Patent: Dec. 7, 1999

[54] COMPOSITION COMPRISING A METAL SALT AND METAL POWDER THEREFROM BY THE CALCINING THEREOF

[75] Inventors: Henri J. M. Grünbauer, Oostburg; Jacobus A. Broos; Frederik R. van Buren, both of Terneuzen, all of Netherlands

[73] Assignee: The Dow Chemical Company, Midland, Mich.

[21] Appl. No.: 08/896,774

[22] Filed: Jul. 18, 1997

[51] Int. Cl.[6] .............................. C08L 71/02; C08K 3/10; C08K 3/18
[52] U.S. Cl. .................... 524/403; 524/247; 524/435; 524/437; 524/612; 501/102; 501/123; 501/152
[58] Field of Search ..................................... 524/612, 247, 524/403, 435, 437; 501/102, 123, 152

[56] References Cited

U.S. PATENT DOCUMENTS

| | | | |
|---|---|---|---|
| 3,325,698 | 6/1967 | Mooneyhan | 317/230 |
| 3,510,323 | 5/1970 | Wismer et al. | 106/41 |
| 3,540,884 | 11/1970 | Horbury | 75/211 |
| 3,658,563 | 4/1972 | Washio et al. | 501/102 |
| 4,367,259 | 1/1983 | Fulmer et al. | 428/240 |
| 4,442,175 | 4/1984 | Flannery et al. | 428/404 |
| 4,569,821 | 2/1986 | Duperray et al. | 419/2 |
| 4,778,671 | 10/1988 | Wusirika | 423/592 |
| 4,917,857 | 4/1990 | Jaeckel et al. | 419/9 |
| 4,929,433 | 5/1990 | Hexemer, Jr. et al. | 423/411 |
| 5,102,836 | 4/1992 | Brown et al. | 501/104 |
| 5,202,306 | 4/1993 | Goretta et al. | 501/152 |
| 5,338,334 | 8/1994 | Zhen et al. | 75/362 |
| 5,698,483 | 12/1997 | Ong et al. | 524/403 |

FOREIGN PATENT DOCUMENTS

| | | | |
|---|---|---|---|
| 835993 | 12/1965 | Canada | C01B 13/14 |
| 0 087 160 | 2/1983 | European Pat. Off. . | |
| 0 422105 B1 | 4/1991 | European Pat. Off. | C01B 13/18 |
| 0 552 133 A1 | 1/1993 | European Pat. Off. . | |
| 0 621234 A1 | 10/1993 | European Pat. Off. | C01B 13/18 |
| 0 621234 B1 | 10/1994 | European Pat. Off. | C01B 13/18 |
| 62-252383 | 4/1968 | Japan . | |
| 59-83972 | 5/1984 | Japan . | |
| 60-215586 | 10/1985 | Japan . | |
| 60-239376 | 11/1985 | Japan . | |
| 61-21960 | 1/1986 | Japan . | |
| 62-158173 | 7/1987 | Japan . | |
| 3-252304 | 3/1990 | Japan . | |
| 3-124404 | 5/1991 | Japan . | |
| 7097566 | 4/1995 | Japan . | |
| 96/29280 | 9/1996 | WIPO | C01B 13/18 |

*Primary Examiner*—Andrew E. C. Merriam

[57] ABSTRACT

Disclosed is a composition of an essentially solid phase state having as components, a liquid hydrophilic organic polymer, an aqueous salt solution containing at least one metallic or metalloid element, and a coagulating agent. The composition on calcination provides a metal-containing powder having an average particle size of 1 micrometer or less. Such metal-containing powders are of value in the preparation of industrial catalysts, ceramics, electronic components, or as fillers in plastics, paints or cosmetics.

9 Claims, No Drawings and on the obtainment of a composition of the desired substantially solid, or semi-solid, nature.

COMPOSITION COMPRISING A METAL SALT AND METAL POWDER THEREFROM BY THE CALCINING THEREOF

This invention relates to a composition which comprises a liquid hydrophilic polymer, an aqueous salt solution of a metallic or metalloid element, and a coagulating agent; and a process for preparing a metal-based powder by calcining the said composition.

BACKGROUND OF THE INVENTION

Metal or metal oxide particles of submicron size are a valuable industrial commodity finding use in many applications including for example in the manufacture of industrial catalyst such as might be employed in the chemical industry, in the manufacture of ceramics, of electronic components, and as fillers for, for example, plastics, paints or cosmetics.

A large variety of techniques are available for the manufacture of metal or metal oxide powders having a very fine particle size. Such techniques include solution processes and high temperature gas phase and condensed phase syntheses. For a comprehensive review of the general techniques available reference is made to the recent publication entitled "Chemical Engineering Aspects of Advanced Ceramic Materials" by V. Hlavacek and J. A. Puszynski published in the Journal of Industrial Engineering and Chemical Research, pages 349–377, Volume 35, 1996.

Despite the numerous procedures available, a problem in common to a lesser or greater extent with nearly all methods is the difficulty of obtaining consistently fine uniform particles of good purity. Procedures that can provide a greater consistency in this respect invariably have high costs associated with their operation due to the complexity of the equipment required, the use of expensive and potentially hazardous raw materials, or high energy consumption. Recently two closely related procedures have been published which provide a means of manufacturing submicron sized metal powders without need of complex and costly equipment. In the publication EP-A-621,234 to manufacture metal powders it is required to calcine a polyurethane polymer containing a metal salt; however yields are relatively low. In another publication, WO96/29280 this polyurethane approach has been modified by avoidance of the use of polyisocyanate, a hazardous chemical, with the requirement to subject to calcination a gel or liquid. Gels are difficult to handle or manipulate in such a calcining procedure; handling of solids is highly preferred.

It would therefore be desirable to develop a cost effective procedure leading to the production of metal or metal oxide powders having a consistently fine particle size. It would be of particular advantage if such a procedure could be operated using raw materials readily available and could be operated in the substantial absence of highly specialized equipment and costly solvents or chemical processing aids. It would also be an advantage if such a procedure were able to provide for the production of metal powders in a more attractive yield by calcination of solids in contrast to gels which are notoriously difficult to handle in industrial procedures.

SUMMARY OF THE INVENTION

In a first aspect, this invention relates to a composition with as components:
a) a liquid hydrophilic organic polymer; and
b) an aqueous salt solution containing at least one metallic or metalloid element;

characterized in that the composition further comprises (c) a coagulating agent, and wherein the salt is present in an amount to provide the composition with metallic or metalloid element content of at least 1 weight percent based on total weight of the composition.

In a second aspect, this invention relates to a process for preparing a metal-based powder, having a mean particle size of less than 1 micrometer, by calcining at a temperature of from about 300° C. to about 3000° C. a composition that comprises:
a) liquid hydrophilic organic polymer; and
b) an aqueous salt solution containing at least one metallic or metalloid element;

characterized in that the composition further comprises (c) a coagulating agent, and the salt is present in an amount to provide the composition with metallic or metalloid element content of at least 1 weight percent based on total weight of the composition.

In a third aspect, this invention relates to a method for solidifying a mixture which contains a liquid hydrophilic organic polymer with an aqueous salt solution of at least one metallic or metalloid element which comprises adding to said mixture a coagulating agent or precursor thereto.

During the present investigations it has been discovered that when a coagulating agent is added to a mixture of a hydrophilic organic polymer, notably a polyether polyol, with an aqueous metal salt solution that the resulting composition takes on a substantially solid, or semi-solid state. It has further been discovered that when such a solid substance is calcined a metal powder of submicron particle size is obtained wherein the BET surface area of the resulting powder can be enhanced through the use of a polyether polyol selected in consideration of having an elevated oxyethylene content.

The present invention provides for a relatively simple and cost-effective route for the manufacture of metal-containing powders of submicron particles size. Such particles find value in the manufacture of ceramic articles, electronics, industrial catalysts and as fillers in plastics, paints or cosmetics including creams and oils. When used as filler, the smaller particle of the filler provide for a minimum reflection of visible light allowing exploitation of filler properties with minimal disturbance to transparency or visible light transmission properties of the substance to be filled. Transmission of electromagnetic radiation of other wavelengths may be blocked by the presence of the filler.

DETAILED DESCRIPTION OF THE INVENTION

Disclosed herein is a composition that is non-fluid substance of an essentially solid, or semi-solid, phase. The composition comprises as first component, a hydrophilic polymer formerly having a liquid phase; as second component, an aqueous salt solution of a metallic or metalloid substance; and is characterized in that it contains as third component, a coagulating agent.

The metallic or metalloid element content of the composition, excluding the counter ion and any water of crystallization, is at least 1 wt. percent based on total weight of the composition. Advantageously the metallic or metalloid element content is at least 3 wt. percent, preferably at least 5, and yet more preferably at least 10 weight percent. While a lesser amount can in principle be present, this is against the interest of obtaining a high yield of metal powder in the subsequent calcining process. In practice, the upper amount of metal salt present will be limited by its solubility limit in water and concomitantly the miscibility with the hydrophilic polymer.

The individual components of the composition are described in more detail hereinafter.

The Hydrophilic Polymer

The hydrophilic polymer component of the composition initially has a liquid phase and can be any inorganic or organic polymer exhibiting a hydrophilic trait including polyethers, polyamides, polyesters and the like. Organic polymers are preferred due to the ability to be calcined or pyrolyzed without any notable accumulation of a solid residue. Suitable hydrophilic organic polymers include polyether polyols, preferably poly(oxyalkylene-oxyethylene) polyols, and more preferably poly(oxyalkylene-oxyethylene) polyols where the oxyethylene content is randomly distributed throughout the molecule. The oxyalkylene portion of the polyol can be oxyethylene, however, oxypropylene or oxybutylene is preferred. When a poly(oxyalkylene-oxyethylene) polyol, is selected as the hydrophilic organic polymer component, advantageously the oxyethylene content of the polyol is from at least 35, and preferably from at least 50, weight percent of the total molecular weight of the polyol. During our investigation little or no influence of polyol molecular weight on the properties of the resulting metal-based powder has been observed. However, for convenience of preparing the composition it is advantageous to select a polyether polyol having a molecular weight in the range of about 500 to about 10000, preferably from about 1000 to about 6000. Exemplary of suitable polyether polyols include glycerine-initiated oxypropylene polyols such as VORANOL 1055 (molecular weight about 1000); and glycerine-initiated oxypropylene-oxyethylene polyols such as VORANOL 1421 (molecular weight 5000, 75 wt. percent ethylene oxide of random distribution), both being available from The Dow Chemical Company.

The Aqueous Salt Solution

The second component of the composition is an aqueous salt solution which comprises one or more metallic or metalloid elements. Advantageously such metallic or metalloid elements are those as defined in the Periodic Table of Elements selected from Groups 2a, 3a, 4a, 5a, 6a; 2b, 3b, 4b, 5b, 6b, 7b, 8, 1b and 2b; the lanthanide elements; and the actinide elements. The metallic or metalloid element can in principle be of any element from which it is desired to obtain a powder, however those presently having known industrial value and suitable for use in the present invention include lanthanum, barium, strontium, chromium, zirconium, yttrium, aluminum, lithium, iron, antimony, bismuth, lead, calcium, magnesium, copper, boron, cadmium, cesium, cerium dysprosium, erbium, europium, gold, hafnium, holmium, lutetium, mercury, molybdenum, niobium, osmium, palladium, platinum, praseodymium, rhenium, rhodium, rubidium, ruthenium, samarium, scandium, sodium, tantalum, thorium, thulium, tin, zinc, nickel, titanium, tungsten, uranium, vanadium, or ytterbium, or a mixture of two or more thereof.

The concentration of salt present in the water is as high as practically possible in consideration of its solubility limit. Where possible it is preferred to use aqueous compositions which are essentially saturated solutions at ambient temperature.

The Coagulating Agent

In this invention by the term "coagulating agent" it is generally meant any substance which is able to induce coagulation, that is induce a change from a fluid state to a solid or semi-solid state.

The coagulating agent can be an organic or inorganic substance having an aqueous pH value of less than 7 (acidic), or greater than 7 (basic). Advantageously the substance should not leave any residue after pyrolysis/calcining. When the coagulating agent is an organic substance, suitable are primary- or secondary-, amines, amides or alkanolamines. Particularly suitable are, for example, monoethanolamine, diethanolamine. When the coagulating agent is an inorganic substance suitable basic substances include for example, ammonium hydroxide, ammonium hydrogen carbonate, ammonium carbonate. Exemplary of inorganic, acidic, coagulating agents include hydrogen sulfide.

Especially preferred as coagulating agent in this invention is ammonium hydroxide due to its high basicity and attractive water solubility leading to a rapid coagulation result. Ammonium hydroxide may be introduced as an aqueous solution or alternatively generated in situ by use of a precursor. Exemplary of precursors include ammonia gas and urea. Urea on exposure to thermal energy undergoes decomposition leading to generation of nascent ammonia which in the aqueous environment provides for immediate formation of ammonium hydroxide. Formation of ammonium hydroxide by way of urea, provides for an extremely effective distribution of the coagulating agent through-out the composition and in any instances superior to that which can be achieved by direct introduction and mechanical mixing.

It is presently believed that a high coagulation rate is required so that a fine dispersion of the salt in the polymer is obtained. In contrast it is believed that a lower coagulation rate provides an undesirable opportunity for growth of metal salt crystals during the coagulation event. Such crystal formation providing a locally high concentration of metal salt within the polymer which subsequently on calcining may lead to the formation of a particle having a larger particle size.

The composition of this invention can be prepared by a variety of addition sequences which include simultaneously mixing all components, or alternatively blending any two components and subsequently introducing the final component. To facilitate the eventual formation of metal powders having a small average particle size/large surface area, it is found advantageous to first mix the hydrophilic organic polymer with the aqueous metal solution and subsequently introduce the coagulating agent. When employing urea as a coagulant precursor, after the initial mixing it is necessary to induce decomposition of the urea by subsequent exposure to, for example, thermal energy. Alternative energy sources can also be used for the same purpose.

Any equipment commonly used in blending viscous liquids can be employed to produce the composition of this invention. Such equipment provides for the efficient mixing, under high shear conditions, of controlled amounts of aqueous base solution with the aqueous composition comprising both the metal salt and the polymeric composition.

The disclosed composition when calcined under controlled conditions, providing for the removal of the all organic substance, results in the formation of a substantially uniformly sized, agglomerate-free, metal-containing powder. Typically the calcining conditions require exposing the composition to a temperature of from about 300° C. to about 3000° C., and preferably from about 400° C. to about 1000° C. for a period of a few minutes to many hours. To assist in removal of the organic polymer, prior to calcining, optionally a pyrolysis step may be employed. The term "metal-containing" can mean that the powder contains metal as an element, or an oxide, or other adduct including for example, carbide or alloy thereof, sulfide or nitride. Whether a powder which is obtained will be a metal, a metal alloy, oxide or carbide will depend upon the metal salt(s) present in the composition and the conditions of pyrolysis or calcining. It is also to be appreciated that the same factors can influence the characteristics of the particles including their size and surface area.

The metal-containing powder obtained according to this invention is characterized in that it has an average particle size of less than 1 micrometer (1000 nanometers), preferably less than about 0.1 micrometer (100 nanometers), and more preferably less than 0.02 micrometer (20 nanometers). With reference to the particle size it is to be appreciated that there will be a particle size distribution where less than about 50, preferably less than about 25, and more preferably less than about 10 percent of the particles will have a particle size in excess of the previously mentioned average particle size. By the term "particle size" it is meant the size of the particle in its largest dimension. The powder is further characterized in that it has a BET surface area of at least 5, preferably at least 25, more preferably at least 50 m$^2$/gram. In a preferred embodiment the metal-containing powder has an average particle size of less than about 0.1 micrometer and a BET surface area of at least 25 m$^2$/gram.

The powder obtainable according to this invention can comprise any desired metal. Advantageously the metal, in a zero or appropriate oxidation state, is one or more of the elements lanthanum, barium, strontium, chromium, zirconium, yttrium, aluminum, lithium, iron, antimony, bismuth, lead, calcium, magnesium, copper, boron, cadmium, cesium, dysprosium, erbium, europium, gold, hafnium, holmium, lutetium, mercury, molybdenum, niobium, osmium, palladium, platinum, praseodymium, rhenium, rhodium, rubidium, ruthenium, samarium, scandium, sodium, tantalum, thorium, thulium, tin, zinc, nickel, titanium, tungsten, uranium, vanadium, or ytterbium.

The described metal-containing powders having a submicron particle size are of value in the manufacture or ceramic articles, industrial catalysts, electronic components, and as fillers for plastics, paints or cosmetics. When used as filler the metal-containing powder will be present, based on total weight of bulk matrix and powder, typically in an amount of from about 0.1 to about 50, and more usually in an amount of from about 1 to about 25 weight percent. The bulk matrix, may be, for example, a plastic including a thermoset or thermoplastic polymer, a paint, or a cosmetic composition cream or oil.

SPECIFIC EMBODIMENTS OF THE INVENTION

The invention is illustrated by way of the following Examples. Unless otherwise indicated all amounts are expressed as parts by weight.

EXAMPLE 1

A number of compositions are prepared by blending of components in the sequence as given in accompanying Table 1. The sequence is indicated by {number} where {1} is first, {2} second and so forth.

The salt solution was prepared by dissolving 50 gr ZrO(NO$_3$)$_2$.xH$_2$O/Ce(NO$_3$).6H$_2$O in a parts by ratio of 6.14:1 in 40 gr H$_2$O.

Amounts in pbw of the various components blended in the indicated order and fashion are as follows:

| POLYOL | 30 pbw |
| SALT | 38.9 pbw |
| SALT SOLUT | 70 pbw |
| BASE | 20 or 60 pbw |

Subsequent pyrolysis/calcining of the resulting compositions at 700° C. resulted in metal powders with a BET surface area, as described by S. Brunauer, P. H. Emmett and E. Teller, J. Am. Chem. Soc. 60 (1938) 309. All BET measurements were carried out using a PULSE CHEMISORB 2700 from Micromeritics Instrument Corporation. Particle sizes were calculated from measured BET surface areas in combination with CeO$_2$ and ZrO$_2$ densities as reported in the Handbook of Chemistry and Physics, 76$^{th}$ edn, CRC Press, 1995.

| | |
|---|---|
| Metal Salt: | ZrO(NO$_3$)$_2$.xH$_2$O/Ce(NO$_3$).6H$_2$O in a parts by ratio of 6.14:1. |
| CP1421 | a glycerine-initiated oxypropylene-oxyethylene polyol of about 5000 molecular weight having a randomly distributed oxyethylene content of about 70 weight percent. |
| CP10B5 | a glycerine-initiated oxypropylene polyol of about 1000 molecular weight. |
| Base | Ammonium Hydroxide, 25% aqueous solution |
| Salt Solution | metal salt as above in water to maximum solubility. |

Examples 1 to 14 and 33 are comparative examples, Examples 15 to 32 are supportive to the disclosed invention. With reference to the data given in Table 1 the following remarks are made:

a) Use of an aqueous metal salt solution in preference to a dry salt provides for a metal powder with a greater surface area;

b) A three-component system generally provides for metal powder having a greater surface area than a two-component system;

c) Use of a polyoxyalkylene-oxyethylene polyol is preferred to use of a polyoxyalkylene polyol when desiring to obtain metal powder with a greater surface area;

d) Examples 21 to 26 are suggestive that the order of addition of sequence does not significantly influence the surface area property of the resulting metal powder.

TABLE 1

| Example | Hydrophilic Organic Polymer | | Metal Salt | | Base | BET Surface Area m$^2$/g | Particle size (nm) |
|---|---|---|---|---|---|---|---|
| | CP1055 | CP1421 | Dry | Aqueous | | | |
| 1 | / | / | / | {1} | / | 10 | 102 |
| 2 | / | / | {1} | / | {2}(20) | 5 | 204 |
| 3 | / | / | / | {1} | {2}(60) | 4 | 255 |
| 4 | {2} | / | {1} | / | / | 11 | 93 |
| 5 | / | {2} | {1} | / | / | 12 | 85 |
| 6 | / | / | / | {2} | {1}(20) | 2 | 509 |
| 7 | {2} | / | / | {1} | / | 20 | 51 |
| 8 | / | {2} | / | {1} | / | 31 | 33 |
| 9 | {3} | / | {1} | / | {2}(20) | 10 | 102 |
| 10 | / | {3} | {1} | / | {2}(20) | 12 | 85 |
| 11 | {1} | / | / | {2} | / | 19 | 54 |
| 12 | / | {1} | / | {2} | / | 28 | 36 |
| 13 | {2} | / | {1} | / | {3}(20) | 9 | 113 |
| 14 | / | {2} | {1} | / | {3}(20) | 11 | 93 |

TABLE 1-continued

| Exam-ple | Hydrophilic Organic Polymer | | Metal Salt | | | BET Surface Area m²/g | Particle size (nm) |
|---|---|---|---|---|---|---|---|
| | CP1055 | CP1421 | Dry | Aqueous | Base | | |
| 15 | {3} | / | / | {1} | {2}(20) | 42 | 24 |
| 16 | / | {3} | / | {1} | {2}(20) | 50 | 20 |
| 17 | {3} | / | / | {1} | {2}(60) | 29 | 35 |
| 18 | / | {3} | / | {1} | {2}(60) | 50 | 20 |
| 19 | {3} | / | / | {2} | {1}(20) | 38 | 27 |
| 20 | / | {3} | / | {2} | {1}(20) | 41 | 25 |
| 21 | {2} | / | / | {1} | {3}(20) | 34 | 30 |
| 22 | / | {2} | / | {1} | {3}(20) | 61 | 17 |
| 23 | {2} | / | / | {3} | {1}(20) | 35 | 29 |
| 24 | / | {2} | / | {3} | {1}(20) | 54 | 19 |
| 25 | {1} | / | / | {2} | {3}(20) | 36 | 28 |
| 26 | / | {1} | / | {2} | {3}(20) | 60 | 17 |
| 27 | {1} | / | / | {2} | {3}(60) | 40 | 25 |
| 28 | / | {1} | / | {2} | {3}(60) | 60 | 17 |
| 29 | {1} | / | / | {3} | {2}(20) | 40 | 25 |
| 30 | / | {1} | / | {3} | {2}(20) | 53 | 19 |
| 31 | {1} | / | / | {3} | {2}(60) | 46 | 22 |
| 32 | / | {1} | / | {3} | {2}(60) | 49 | 21 |
| 33 | / | / | / | {1} | {2}(60) | 6 | 170 |

What is claimed is:

1. A process for preparing a metal-based powder having a mean particle size of less than 1 micrometer by calcining at a temperature of from about 300° C. to about 3000° C. a composition that comprises:
  a) liquid hydrophilic organic polymer comprising a poly(oxyalkylene-oxyethylene) polyol that has a randomly distributed oxyethylene content of at least 35 weight percent based on total weight of the polyol; and
  b) an aqueous salt solution containing at least one metallic or metalloid element;
wherein the composition further comprises an alkanolamine as a coagulating agent in an amount sufficient to cause the composition of the polymer, salt solution and coagulating agent to solidify, and the salt is present in an amount to provide the composition with metallic or metalloid element content of at least 5 weight percent based on total weight of the composition, and
  obtaining a metal containing powder having a mean particle size of less than 1 micrometer.

2. A process for preparing a metal-based powder having a mean particle size of less than 1 micrometer by
  calcining at a temperature of from about 300° C. to about 3000° C. a composition that comprises:
    a) liquid hydrophilic organic polymer comprising a poly(oxyalkylene-oxyethylene) polyol that has a randomly distributed oxyethylene content of at least 35 weight percent based on total weight of the polyol; and
    b) an aqueous salt solution containing at least one metallic or metalloid element:
  wherein the composition further comprises ammonium hydroxide as a coagulating agent in an amount sufficient to cause the composition of the polymer, salt solution and coagulating agent to solidify, and the salt is present in an amount to provide the composition with metallic or metalloid element content of at least 5 weight percent based on total weight of the composition, and
    obtaining a metal containing powder having a mean particle size of less than 1 micrometer.

3. A process for preparing a metal-based powder having a mean particle size of less than 0.1 micrometer consisting essentially of:
  a. mixing, under high shear conditions,
    1) liquid hydrophilic organic polymer,
    2) aqueous salt solution containing at least one metallic or metalloid element in an amount such that it constitutes at least 5 weight percent of the total of the liquid hydrophilic organic polymer, the salt solution and the coagulating agent, and
    3) an amount of a coagulating agent effective to cause the mixture so obtained to solidify;
  b. calcining the solid mixture obtained in step (a); and
  c. recovering the metal containing powder formed thereby, said powder having a mean particle size of less than 0.1 micrometer.

4. The process of claim 2 wherein the metal containing powder is recovered in a yield of at least 10 weight percent.

5. A process for preparing a metal-based powder having a mean particle size of less than 0.1 micrometer consisting essentially of:
  a. mixing, under high shear conditions,
    1) a liquid hydrophilic organic polymer,
    2) an aqueous salt solution containing at least one metallic or metalloid element in an amount such that it constitutes at least 5 weight percent of the total of the liquid hydrophilic organic polymer, the salt solution and the coagulating agent, and
    3) an amount of a coagulating agent effective to cause the mixture so obtained to solidify;
  b. calcining the solid mixture obtained in step (a); and
  c. recovering the metal containing powder formed thereby, said powder having a mean particle size of less than 0.1 micrometer and a BET surface area of at least 25 m²/gram.

6. A process for preparing a metal-based powder having a mean particle size of less than 1 micrometer by calcining at a temperature of from about 300° C. to about 3000° C. a composition that comprises:
  a) a polyether polyol; and
  b) an aqueous salt solution containing at least one metallic or metalloid element;
where in the composition further comprises a coagulating agent in an amount sufficient to cause the composition of the polyether polyol, salt solution and coagulating agent to solidify, and the salt is present in an amount to provide the composition with metallic or metalloid element content of at least 5 weight percent based on total weight of the composition, excluding the counter ion and any water of crystallization, and
  obtaining a metal containing powder having a mean particle size of less than 1 micrometer.

7. The process of claim 6 wherein the hydrophilic organic polymer is a poly(oxyalkylene-oxyethylene) polyol that has a randomly distributed oxyethylene content of at least 35 weight percent based on total weight of the polyol; and wherein the coagulating agent is an alkanolamine.

8. The process of claim 7 wherein the hydrophilic organic polymer is a poly(oxyalkylene-oxyethylene) polyol that has randomly distributed oxyethylene content of at least 35 weight percent based on total weight of the polyol; and wherein the coagulating agent is ammonium hydroxide.

9. A process for preparing a metal-based powder having a mean particle size of less than 1 micrometer consisting essentially of:
  a. mixing, under high shear conditions,
    1) a liquid hydrophilic organic polymer comprising a polyether polyol,
    2) an aqueous salt solution containing at least one metallic or metalloid element in an amount such that it constitutes at least 5 weight percent of the total of the liquid hydrophilic organic polymer, the salt solution and the coagulating agent, excluding the counter ion and any water of crystallization, and
3) an amount of a coagulating agent effective to cause the mixture so obtained to solidify;

b. calcining the solid mixture obtained in step (a); and
c. recovering the metal containing powder formed thereby, said powder having a mean particle size of less than 1 micrometer.

* * * * *